United States Patent [19]

Kunde et al.

[11] Patent Number: 4,527,300
[45] Date of Patent: Jul. 9, 1985

[54] APPARATUS FOR CLEANING THE BEAD SEATING PROFILE OF A TIRE RIM

[75] Inventors: Wayne C. Kunde, 2945 Brush Rd., Richfield, Ohio 44286; Martial J. Robitaille, Bedford, Ohio

[73] Assignee: Wayne C. Kunde, Richfield, Ohio

[21] Appl. No.: 541,012

[22] Filed: Oct. 12, 1983

[51] Int. Cl.³ ............................................. A46B 13/02
[52] U.S. Cl. ..................................... 15/21 C; 15/21 D
[58] Field of Search ................. 134/6; 15/21 R, 21 C, 15/21 D, 21 E, 246

[56] References Cited

U.S. PATENT DOCUMENTS

| 2,150,462 | 3/1939 | Schultz et al. | 15/21 D X |
| 2,807,038 | 9/1957 | Henry | 15/21 D |
| 2,915,766 | 12/1959 | Peterson | 15/21 R |
| 4,426,747 | 1/1984 | Mola et al. | 15/21 D |

Primary Examiner—Marc L. Caroff
Attorney, Agent, or Firm—Maky, Renner, Otto & Boisselle

[57] ABSTRACT

Apparatus for cleaning the annular bead seating profile of a tire rim. The tire rim is supported with the central axis of the rim disposed in a predetermined orientation. A cleaning brush is rotatable about an axis, and means are provided for rotating the cleaning brush about the axis. Means are provided for supporting the cleaning brush in an orientation in which it engages the bead seating profile at the outer peripheral surface of the tire rim as the cleaning brush rotates about its axis. Additionally, means are provided for maintaining the cleaning brush under a predetermined state of pressure against the bead seating profile of the tire rim, the tire rim and the cleaning brush also being supported in such a manner that the cleaning brush can orbit relative to the outer peripheral surface of the tire rim while the cleaning brush is maintained in said predetermined orientation and in said predetermined state of pressure against the bead seating profile of the rim, to effect cleaning of the bead seating profile of the tire rim as the cleaning brush rotates about its axis and orbits relative to the outer peripheral surface of the tire rim.

14 Claims, 11 Drawing Figures

APPARATUS FOR CLEANING THE BEAD SEATING PROFILE OF A TIRE RIM

BACKGROUND OF THE INVENTION

The present invention relates to an apparatus for cleaning the metal rim of a wheel such as used on a vehicle.

A vehicle wheel generally comprises a synthetic elastic rubber body (tire) that is mounted on an annular metal rim. The annular metal rim has an annular outer portion that circumscribes a central axis, and a radial portion that extends radially inward toward the central axis. The tire has a bead section that sealingly engages against a pair of annular bead seating profiles on the rim when the tire is mounted on the rim and inflated with air. Often, each of the bead seating profiles of the rim has a complex outer periphery that is shaped to allow it to engage the bead section of the tire in tight seating engagement in order to seal against leakage and to transmit torque between the tire and the metal rim.

Normally, during assembly of a tire, the bead section of the tire is disposed against the annular outer portion of the metal rim, and is held in tight sealing relation with it by air pressure. A liquid lubricant or sealer may be disposed between the tire and the metal rim to further help seal between those members.

When it is desired to change a tire, or to repair it, the tire first has to be separated from the metal rim. To do that, the tire is mounted on a tire changing device, of well known construction, that supports the metal tire rim in a fixed position. The tire is loosened from engagement with the bead seating profiles of the rim by upper and lower ram type wedges. Then, a power driven lever-like tool is wedged between the tire and the metal rim, and rotated at least partially about the periphery of the metal rim to separate the tire from the metal rim.

Often, when a tire is removed from a metal rim, a visual inspection reveals considerable rust deposits, rubber deposits, or other dirt on the upper and lower bead seating profiles of the metal rim. The deposits can be caused by various factors, e.g., foreign substances (salt, grit, etc.) that work their way between the tire and the bead seating profiles of the rim, or rust that forms on the metal rim itself. Such substances, if allowed to remain on the bead seating profiles of the metal rim, can prevent a tire from properly seating against the bead seating profiles of the metal rim when the tire is attached to the metal rim. In the case of tubeless tires, this can result in slow leakage of air from the tire. Moreover, with both tubeless and tube tires, corrosion or debris on the bead seating profiles of the rim can impair proper torque transmission between the tire and the rim. Also, corrosion, if not removed from the bead seating profiles of the rim, can propagate and ultimately damage the metal rim itself.

SUMMARY OF THE INVENTION

The present invention provides an apparatus and method for cleaning the bead seating profiles of a metal rim, before a tire is secured to the metal rim. The invention is useful in cleaning the bead seating profiles of a metal rim when the tire is being changed, so that the cleaning is effected before the new or repaired tire is attached to the metal rim. The preferred embodiment of the invention incorporates the cleaning apparatus into a conventional tire-changing mechanism, so that the bead seating profiles of a metal rim can be cleaned at the time a tire is being changed.

According to the invention, a metal tire rim is supported with its central axis disposed in a predetermined orientation. With a conventional tire changing mechanism, the metal tire rim would be supported with its central axis disposed vertically. A cleaning brush is supported for rotation about an axis and the cleaning brush is also supported in an orientation in which it engages the bead seating profile on the outer peripheral surface of the rim as the cleaning brush rotates about its axis. Further, the tire rim and the cleaning brush are supported in such a manner that the cleaning brush can orbit relative to a bead seating profile at the outer peripheral surface of the tire rim while the cleaning brush is engaging the bead seating profile of the outer peripheral sealing surface of the metal rim. Still further, the cleaning brush is supported in such a way that it is maintained in a predetermined state of pressure against the bead seating profile of the tire rim as the cleaning brush orbits relative to the bead seating profile of the tire rim. As the cleaning brush rotates about its axis and orbits relative to the bead seating profile at the outer peripheral surface of the rim, it cleans the rust deposits, rubber deposits and other foreign substances and corrosion from the bead seating profile of the metal tire rim.

In the preferred embodiment, the cleaning brush is maintained under a predetermined state of pressure against the bead seating profile at the peripheral surface of the tire rim, and the amount of pressure is selectively adjustable. Specifically, a guide roller member is connected to the cleaning brush, and is spaced from the cleaning brush about the periphery of a tire rim. The guide roller rolls (or orbits) along the bead seating profile at the peripheral surface of the tire rim, and holds the cleaning brush in engagement with the bead seating profile of the rim as the cleaning brush cleans the bead seating profile of the rim. The spacing between the guide roller and the cleaning brush determines the amount of pressure that exists between the cleaning brush and the bead seating profile of the rim as the cleaning brush orbits relative to the rim. The spacing between the guide roller and the cleaning brush is selectively adjustable to adjust the pressure between the cleaning brush and the bead seating profile of the rim.

According to a further feature of the invention, the cleaning brush is also selectively adjustable in both radial and axial directions relative to the bead seating profile of the tire rim. Thus, the cleaning brush can be adjusted axially along the periphery of the tire rim, and radially relative to the tire rim, so that it can completely clean bead seating profiles along the periphery of the tire rim.

BRIEF DESCRIPTION OF THE DRAWINGS

Further objects and advantages of the invention will become further apparent from the following detailed description taken with reference to the accompanying drawings wherein.

DETAILED DESCRIPTION OF THE PREFERRED EMBODIMENT

As discussed above, the invention provides a method and apparatus for cleaning the bead seating profiles of a metal tire rim, and the apparatus can be incorporated into a conventional tire changing mechanism. FIGS. 1-8 show the apparatus incorporated into a conventional tire-changing mechanism, after the tire has been removed from a rim and the rim is being supported on the tire-changing mechanism.

Figures 9, 11:
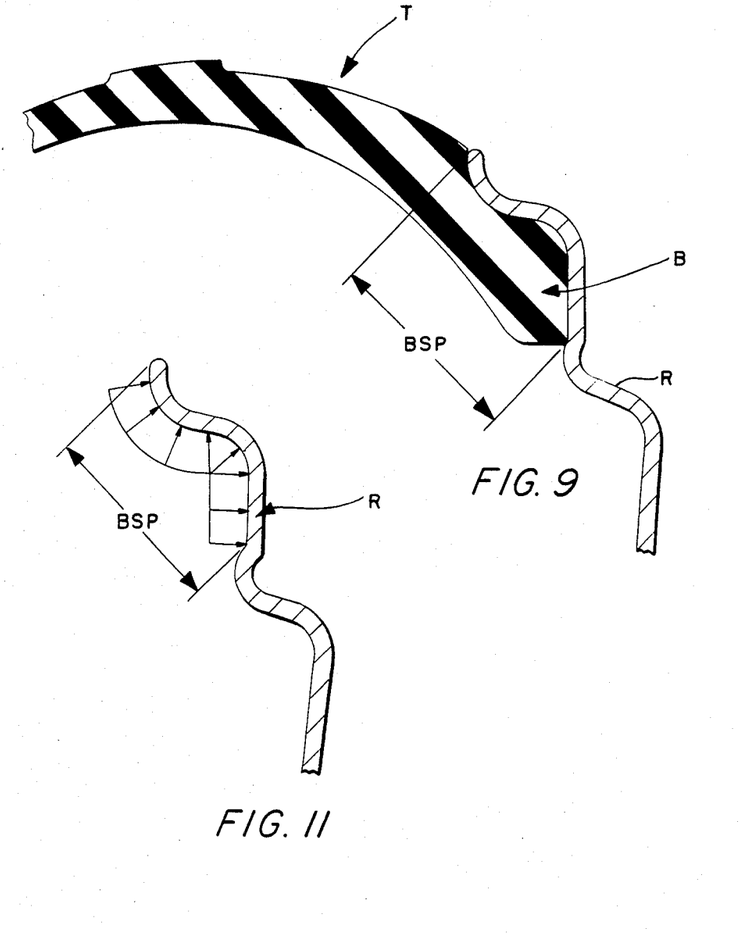
FIG. 9 is a schematic, fragmentary, sectional view of a tire disposed against one of the annular bead seating profiles of a tire rim.
FIG. 11 is a view of the bead seating profile of the rim of FIG. 9, with the tire removed, and the area of pressure thereon shown by arrows.
Figure 10:
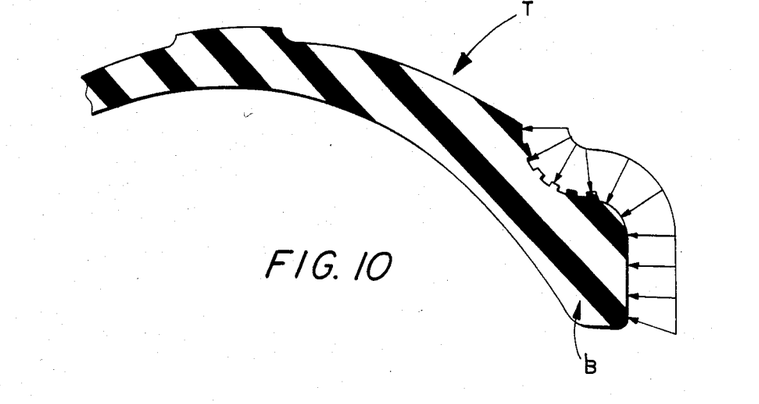
FIG. 10 is a view of the tire of FIG. 9, before it is attached to the bead seating profile of the rim, and with the area of principal pressure thereon shown by arrows.

Initially, it is important to understand the criticality of proper sealing between a tire and a metal rim at the bead seating profiles of the metal rim. FIGS. 9-11 illustrate the principles of engagement between a tubeless tire T and one of the annular bead seating profiles BSP on a metal tire rim R. As illustrated by FIG. 9, a tubeless tire T has a bead B that seats against the annular bead seating profile BSP along the outer periphery of the metal rim R. When the tire is inflated with air, the bead must seat tightly against the bead seating profile BSP of the metal rim to seal against leakage of air, and to transmit torque between the tire and the metal rim.

FIG. 10 schematically illustrates (by arrows) the area where the principal pressures are applied against the outer periphery of the tire T, when it engages the bead seating profile of the metal rim. FIG. 11 schematically illustrates (by arrows) the area of the bead seating profile BSP where those principal pressures are applied. With a tubless tire, as shown in FIG. 9, it is critically important to achieve a tight engagement between the tire bead and the bead seating profiles of the rim, both for good torque transmission, but also for proper sealing. With tube tires, where the tire itself is an annular closed body, the sealing problem is not as critical, but the torque transmission problem between the tire and the rim is still very important. Thus, a tube tire must tightly engage the bead seating profile of a metal rim to insure proper torque transmission between the tire and the rim. Deposits of rust, rubber particles, or any other foreign substances or debris in the bead seating profile of the metal rim can impair proper torque transmission, in the case of both tube and tubeless tires. Further, such deposits can impair proper sealing between a tubeless tire and a metal rim. Thus, the applicants believe that the ability to effectively clean the entire bead seating profile of a metal tire rim, particularly at the time that a tire is changed, is extremely important.

Figure 1:
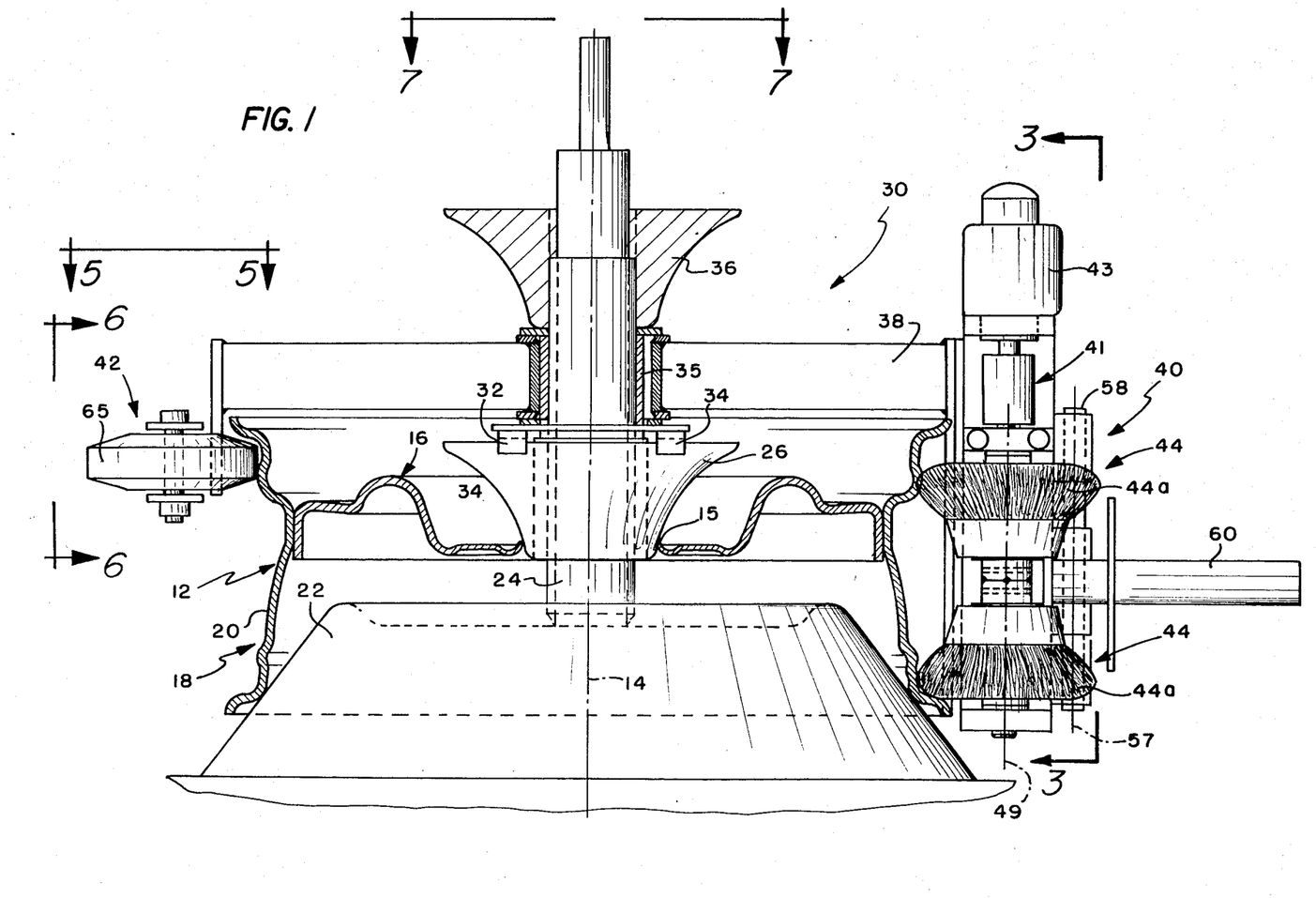
FIG. 1 is a side view of a tire-changing mechanism, with cleaning apparatus according to the invention connected thereto.
Figure 2:
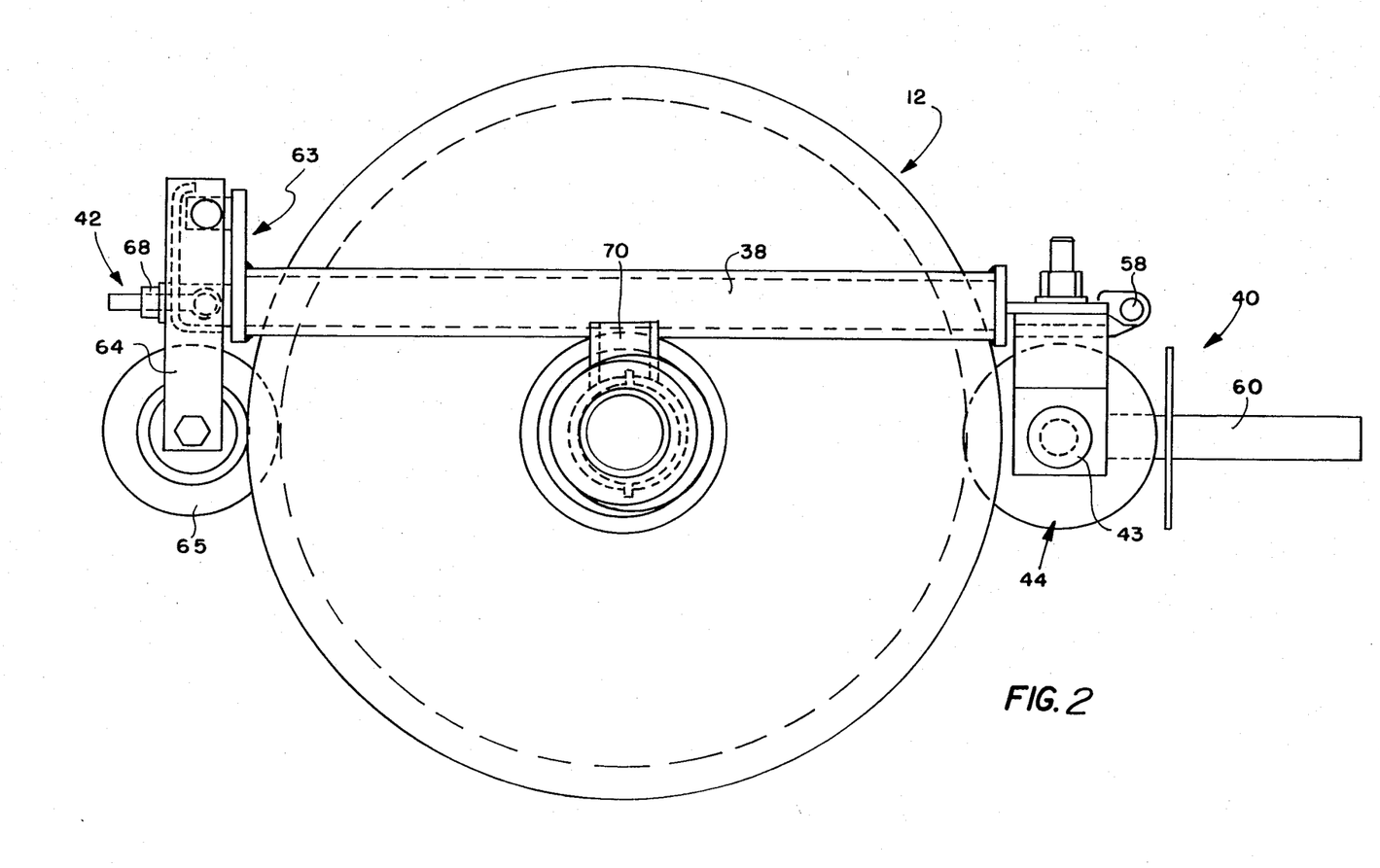
FIG. 2 is a top view of the tire-changing mechanism and cleaning brush of FIG. 1.

As shown by FIG. 1, a metal tire rim typically comprises an annular metal body 12 that circumscribes a central axis 14. The annular metal body 12 defines (i) a central opening 15, (ii) a radial portion 16 that extends outward from the central opening 15 and an axially extending outer portion 18. As can be seen in FIG. 1, the radial portion 16, and the outer portion 18 are not straight, but are somewhat complex geometrical forms. The outer portion 18 has the annular bead seating profiles BSP at its outer peripheral surface 20, and it is those profiles that are cleaned by apparatus according to the principles of this invention.

In this application, reference to the "radial portion" of a tire rim means a portion such as shown at 16 in FIG. 1, that extends in a generally radial direction, relative to the central axis 14 of the rim, regardless of its particular geometric configuration. Reference to an "outer portion" of a tire rim means a portion of a tire rim that extends axially with respect to the central axis 14 of the rim, again regardless of its specific geometric configuration. Reference to the "outer peripheral surface" of a tire rim means the radially outermost surface of that outer portion, which has the bead seating profiles that are engaged by the tubular rubber body of a tire, and which are most susceptible to corrosion and collection of dirt. It is the bead seating profiles of a tire rim, at that outer peripheral surface, that are cleaned by apparatus according to the principles of the present invention.

The tire rim changing mechanism includes a conical base support 22, and a threaded central shaft 24 which is connected to the conical base support 22. Normally, a tire rim is supported by a tire changing mechanism with one axial side of the metal rim resting on the conical base support 22, and the central opening 15 of the tire rim surrounding the central shaft 24. A conical chuck 26 has internal threads that engage the central shaft 24, and the conical chuck 26 is utilized to clamp the tire rim fast against the base support 22. While the metal rim is clamped against the base support 22, a tire can be attached to, or removed from, the metal rim. The mechanism includes wedges (not shown) for loosening the tire from the bead seating profiles of the rim, and a power driven lever-like tool (also not shown) that is rotated about the rim to remove the tire from the rim.

The rim cleaning apparatus according to the preferred embodiment is attached to the tire changing mechanism, when the tire has been removed from a metal tire rim, and the metal tire rim is still clamped against the base support 22. The rim cleaning apparatus comprises a support assembly 30 that includes a disc 32 which surrounds the central shaft 24 and is held against rotation by tabs 34 that engage mating slots in the conical chuck 26. A sleeve 35 surrounds the portion of the central shaft 24 and is supported on the disc 32. Another conical chuck 36 threadedly engages the portion of shaft 24 that extends beyond the sleeve, and operates to clamp the sleeve 35 to the tire changing mechanism.

A cross tube 38 is connected to the sleeve 35, and extends at least partially across a tire rim supported on the apparatus. As seen from FIG. 2, the cross tube 38 is offset from the central axis 14 of the tire rim. One end of the cross tube supports a cleaning brush assembly 40. The other end of the cross tube 38 supports a tensioning device, which according to the preferred embodiment, comprises a roller assembly 42.

Figure 3:
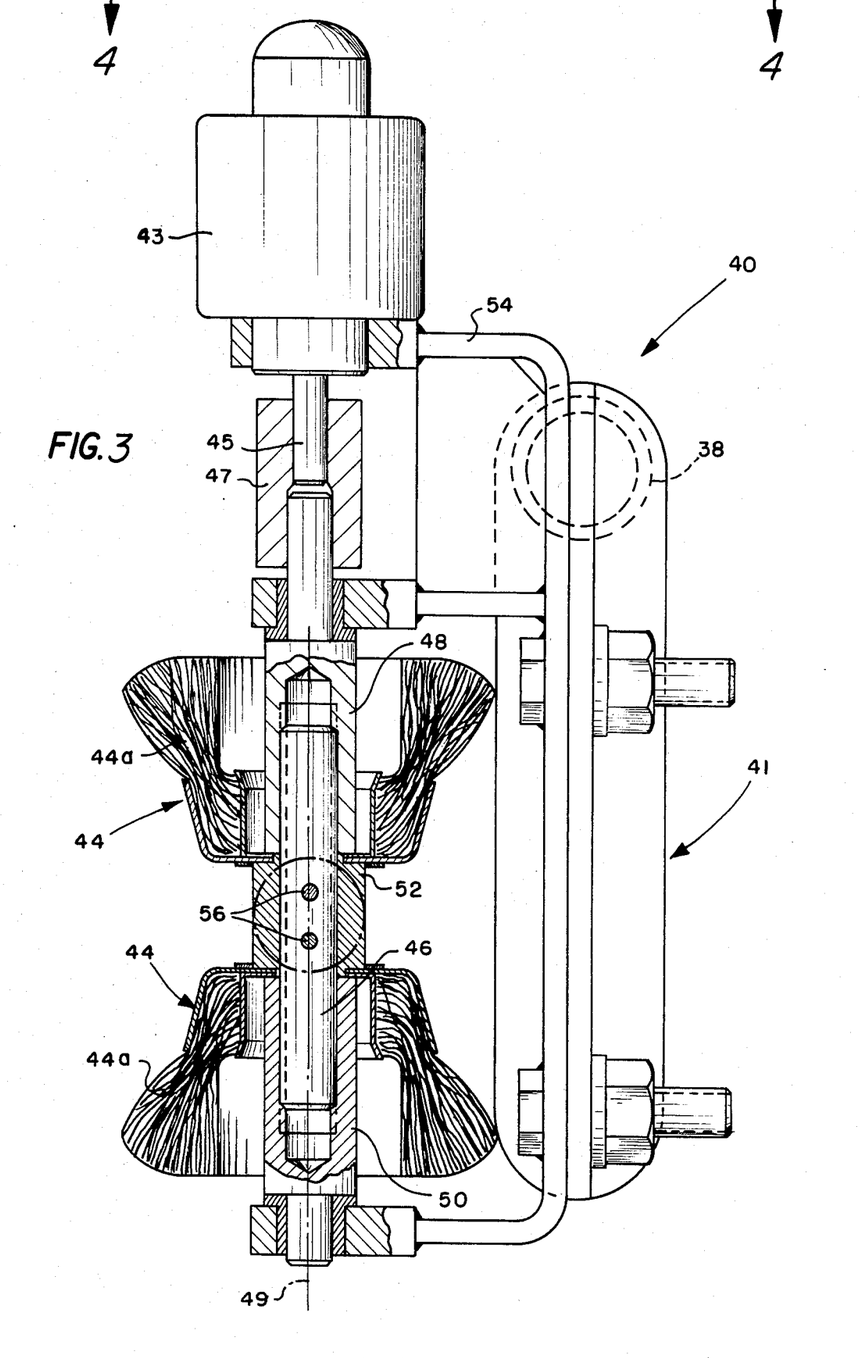
FIG. 3 is a view of the cleaning brush assembly of FIG. 1, taken from the direction 3—3.
Figure 4:
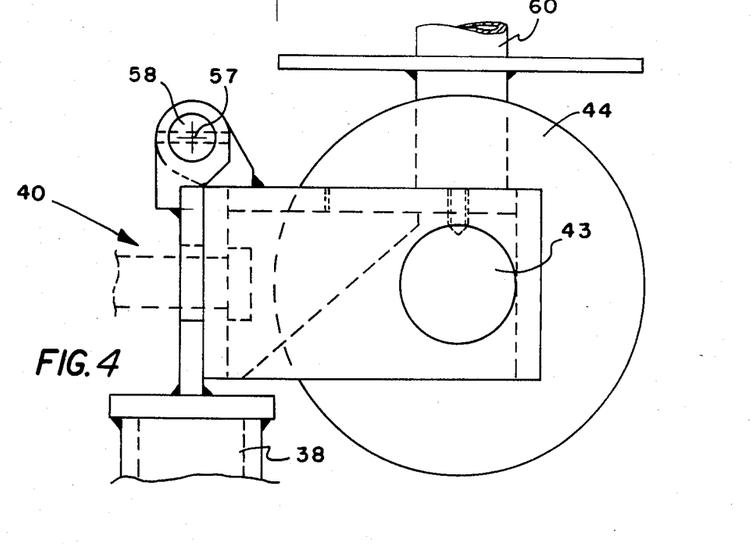
FIG. 4 is a fragmentary, enlarged view of the cleaning brush assembly of FIG. 3, taken from the direction 4—4.
Figure 5:
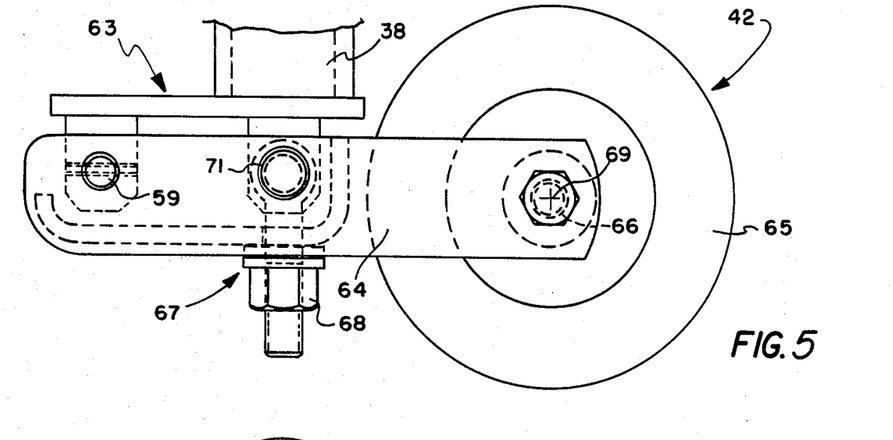
FIG. 5 is a fragmentary, enlarged top plan view of the guide roller assembly of FIG. 1 taken from the direction 5—5.
Figure 6:
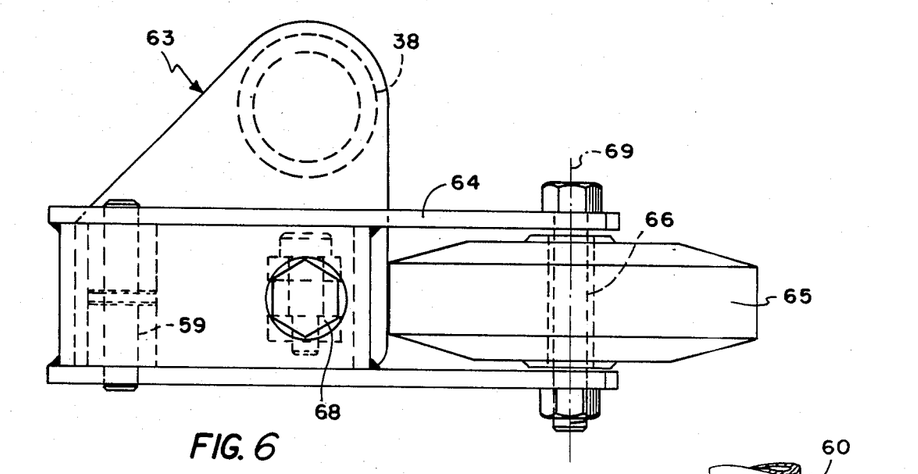
FIG. 6 is a fragmentary, side elevation view of the guide roller assembly of FIG. 1, taken from the direction 6—6.
Figure 7:
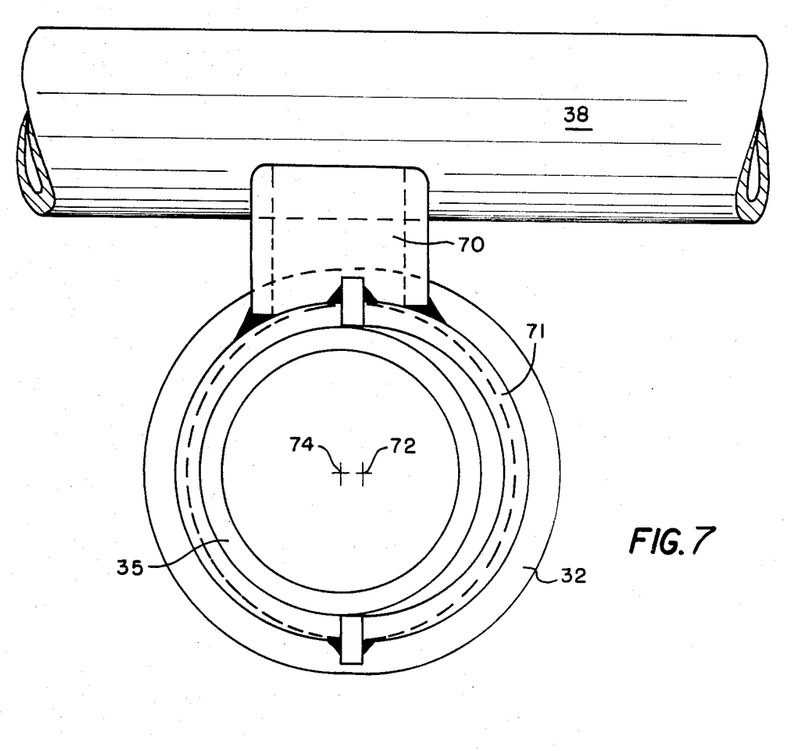
FIG. 7 is an enlarged fragmentary view of part of the cleaning apparatus of FIG. 1, taken from the direction 7—7, and showing the mechanism for adjusting the pressure between the cleaning brush and the tire rim.
Figure 8:
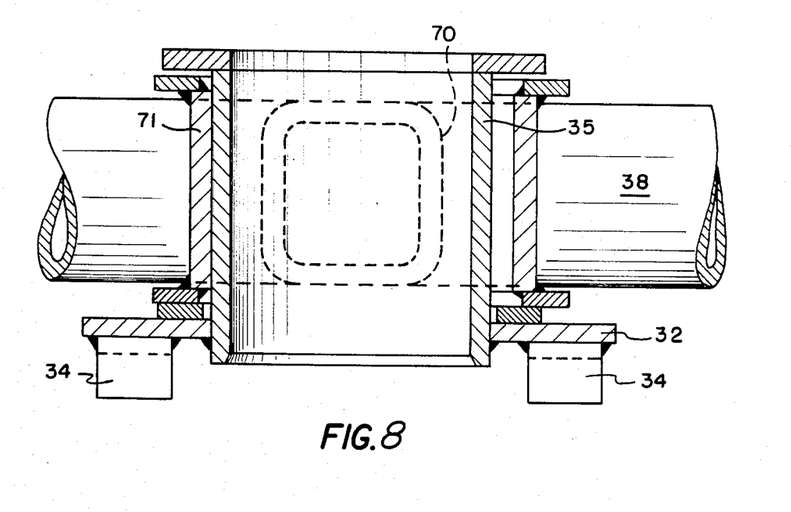
FIG. 8 is a sectional view of the mechanism of FIG. 7, taken from the direction 8—8.

The cleaning brush assembly 40 is shown in FIGS. 1 and 3. It includes (i) a support frame 41 fixedly connected to the cross tube 38, (ii) a motor 43 connected to the support frame 41, and (iii) a pair of brushes 44 that are supported for rotation about a shaft 46 extending parallel to the central shaft 24 that supports the tire rim. The brushes 44 have outwardly flared metal bristles 44a that are anchored between respective collars 44b, 44c that surround the shaft 46. The bristles 44a are designed to engage the bead seating profiles at the outer peripheral surface 20 of a metal tire rim to clean those bead seating profiles of the metal rim. The rotation of the bristles helps urge them against the bead seating profiles of a tire rim, to promote the cleaning action of the bristles.

The motor 43 has an output shaft 45 that drives a rotary coupling member 47, and that coupling member drives a sleeve 48 that surrounds the shaft 46. The sleeve 48 has a splined connection to one end of the shaft 46, so that the sleeve 48 and the shaft 46 can rotate jointly. The sleeve 48 can also slide axially along the shaft 46. Another sleeve 50 is splined to the other end of shaft 46. That sleeve can also slide axially along the shaft 46.

A spacer member 52 is splined to the shaft 46, and is located between the sleeves 48 and 50. The sleeve 48 clamps the collars 44b, 44c of one brush against one side of the spacer member 52. The sleeve 50 clamps the collars 44b, 44c of the other brush 44 against the other side of the spacer member 52.

The motor's output shaft 45, and the sleeves 48, 52 are supported in respective bearings in support member 54 that is supported from the frame 41. Those members all rotate about a common central axis 49 that is parallel to the central axis 14 of a tire rim. Rotation of motor 43 rotates the brushes 44 and the shaft 46 about the common central axis 49.

The brushes 44 and the spacer member 52 can be moved axially along the shaft 46 by shifting the sleeves 48, 50 and the spacer member 52 axially along the shaft 48. The splined connections between the shaft 46 and sleeves 48, 50 and spacer member 52 couple those members for joint rotation, but allow the sleeves 48, 50 and the spacer member 52 to slide axially along the shaft 46. The sleeves 48, 50 and the spacer member 52 can be fixed at a particular axial location along the shaft 46 by tightening locking screws 56 that fix the spacer member 52 to the shaft 46. The locking screws 56 can be loosened in order to slide the sleeves 48, 50, the spacer member 52, and the brushes 44 axially along the shaft 46.

The support member 54 that supports the cleaning brushes 44 for rotation is pivotal about a shaft 58 that is supported on the frame 41. By pivoting the support member 54 about the shaft 58, the brushes 44 can be moved radially into and out of engagement with the bead seating profiles of the tire rim. A handle 60 that is connected to the support member 54 can be manually operated to pivot the cleaning brush assembly 40 about the shaft 58. Locking means (not shown) can be provided to lock the support member 54 (and thereby the cleaning brushes 44) in a predetermined angular position relative to the bead seating profile of a tire rim.

The guide roller assembly 42 at the other end of the cross tube 38 includes a frame 63 fixedly connected to the cross tube 38. A pivot shaft is connected to the frame 63, and a longitudinal member 64 is connected with the shaft 59 and can pivot about the central axis 57 of the shaft 59. A roller 65 is supported for free rotation about another shaft 66 that is mounted on the longitudinal member 64. The shaft 66 supports the roller 65 in a position such that the roller 65 can engage the bead seating profile of a metal tire rim supported on the apparatus. As seen from FIG. 1, the shaft 66 defines an axis of rotation 69 for the roller 65, and that axis of rotation 69 is parallel to the central axis 14 of a tire rim. Also, as seen from FIG. 2, the axis of rotation 69 of the roller 65 is diametrically opposite the axis of rotation 49 of the brushes 44. The longitudinal member 64 can pivot about the shaft 59, to allow the roller 65 to be pivoted about the axis 57 toward and away from a tire rim.

A pivot rod 67 is pivotally connected to the frame 63 and the longitudinal member 64, at a point located between the pivot shaft 59 and the shaft 66 that supports the rubber wheel 66. The pivot rod 67 is pivotal on a pin 71 that is supported by the frame and the longitudinal member 64 and which defines a pivot axis 73 that is parallel to the central axis 57 of the shaft 59 and the axis of rotation 69 of the roller 65. A locking nut 68 is associated with the pivot rod 67. The locking nut 68 can be tightened to secure the pivot rod 67 to the frame 63. That locks the longitudinal member 64 in a predetermined angular position relative to the frame 63. The locking nut 68 can be loosened in order to allow the longitudinal member 64 to pivot about the shaft 59, thus allowing the angular position of the longitudinal member 64 relative to the frame 63 to be changed.

The center portion of the cross tube 38 is fixedly connected to a sleeve 70 that extends at right angles to the cross tube 38. The sleeve 70 has an integral hub 71 which surrounds the sleeve 35 that is fixed to the central shaft 24. Importantly, as seen from FIG. 1, the central axis 72 of the hub 71 is eccentrically offset from the common central axis 74 of the sleeve 35 and the central shaft 24. The hub 71 can orbit about the sleeve 35, to allow the entire cleaning assembly, including the brushes 44, to orbit about the tire rim.

When the roller 65 and the brushes 44 are engaged with the bead seating profile(s) at the outer peripheral surface 20 of a tire rim, the hub 71 has an eccentric position relative to shaft 24. The roller 65 engages one of the bead seating profiles of the rim, and holds the cleaning brushes 44 in a position that places the brushes that engage the bead seating profile of the rim under a predetermined pressure against the bead seating profile of the metal tire rim, as the roller and the brushes orbit about the tire rim. For example, in FIG. 1, the roller 65 engages the upper bead seating profile of the rim, and the brush assembly has been shifted downwardly, so that one of the brushes engages the lower bead seating profile on the rim. In order to change the pressure between the brushes and the rims, the locking nut 68 associated with pivot lever 67 is loosened, and the longitudinal member 64 is pivoted about shaft 59. As the longitudinal member 64 pivots, the pivot rod 67 pivots about the shaft 59 and the cross rod 38 shifts axially. When the cross tube 38 is shifted axially, the eccentricity of the hub 71 relative to shaft 24, changes. As that eccentricity changes, the spacing between the roller 65 and the cleaning brushes 44 changes. As the spacing changes, the pressure between the brushes 44 and the bead seating profiles of a tire rim also changes. Thus, changing the eccentricity of hub 71 on the shaft 24 adjusts the pressure between the brushes 44 and the bead seating profiles at the outer periphery of the metal tire rim.

In use, the guide roller 65 and the brushes 44 are disposed against the bead seating profile(s) at the periphery of the rim, and the motor 43 is operated to rotate the brushes 44 and the shaft 46 about the central axis 49. Then, the support assembly 30 is orbited about the outer peripheral surface 20 of the tire rim so as to orbit the brushes 44 about the bead seating porfile(s) at the periphery of the rim. The handle 60 on the brush assembly allows the support assembly 30 to be manually orbited about the rim. However, it is contemplated that a motor can also be used to drive the support assembly 30 about the tire rim. Cleaning of the bead seating profile of the rim is effected as the brushes 44 rotate about their axis, and orbit about the periphery of the tire rim.

As seen by the preferred embodiment, a cleaning apparatus according to the invention can be incorporated into a conventional tire changing mechanism. However, it is also contemplated that cleaning apparatus according to the principles of this invention can be formed as an integral part of a tire changing mechanism. Still further, it is contemplated that a separate cleaning mechanism can be constructed according to the principles of the invention, rather than incorporating the cleaning mechanism into a tire changing mechanism.

Additionally, while the preferred embodiment discloses the brushes as orbiting about the periphery of a fixed metal rim, it is contemplated that the brushes could be maintained in a fixed location, and the rim rotated about its central axis to effect orbital movement of the brushes relative to the bead seating profile of the rim. In this application, reference to the brushes as orbiting relative to the bead seating profile(s) at the periphery of the rim is intended to encompass both types of movement.

Further, it is contemplated that the apparatus may include a shield disposed above the brushes which engage the bead seating profile of a metal rim, to protect against scattering of the debris that is cleaned from the metal rim. Moreover, it is contemplated that various alternatives for tensioning the brushes against the bead seating profile of the rim, and various alternatives for powering the roller will be apparent to those of ordinary skill in the art. For example, the guide roller 65 could also be powered to enable the roller and the brushes to orbit about the metal rim. Further, the roller could be designed to function as a drag roller to help increase the tension between the brushes and the bead seating profile(s) of the rim. Finally, while the motors for operating the brushes are preferably air motors, it will of course be apparent to those of ordinary skill in the art that they could also be hydraulic or electric.

What is claimed is:

1. Apparatus for cleaning the annular bead seating profile of a tire rim, the bead seating profile being integral with the tire rim and circumscribing the central axis of the tire rim, said apparatus comprising means for supporting the tire rim with the central axis of the rim disposed in a predetermined orientation, a cleaning brush rotatable about an axis of rotation, means for rotating the cleaning brush about said axis of rotation, means for supporting the cleaning brush in an orientation in which it engages the bead seating profile at the outer peripheral surface of the tire rim as the cleaning brush rotates about its axis of rotation and is maintained under a predetermined state of pressure against the bead seating profile of the tire rim, the tire rim and the cleaning brush also being supported in such a manner that the cleaning brush can orbit relative to the outer peripheral surface of the tire rim while the cleaning brush is maintained in said predetermined orientation and in said predetermined state of pressure against the bead seating profile of the rim, to effect cleaning of the bead seating profile of the tire rim as the cleaning brush rotates about its axis of rotation and orbits relative to the outer peripheral surface of the tire rim, said means for supporting the cleaning brush comprising a guide roller coupled to said cleaning brush and engageable with the bead seating profile of the tire rim, the guide roller being disposed in spaced relation to said cleaning brush about the periphery of the tire rim, the spacing between said guide roller and said cleaning brush being adjustable to adjust the pressure of the cleaning brush against the bead seating profile of the tire rim, and means for selectively adjusting the spacing between the guide roller and the cleaning brush to adjust the pressure of the cleaning brush against the bead seating profile of the tire rim.

2. Apparatus for attachment to a tire changing mechanism for cleaning the annular bead seating profile of a tire rim supported on the tire changing mechanism, said apparatus comprising means for engaging the tire changing mechanism while the tire changing mechanism is supporting the tire rim with the central axis of the rim disposed in a predetermined orientation, a cleaning brush rotatable about an axis of rotation, means for rotating the cleaning brush about said axis of rotation, means for supporting the cleaning brush in an orientation in which it engages the bead seating profile at the outer peripheral surface of the tire rim as the cleaning brush rotates about its axis of rotation and for maintaining the cleaning brush under a predetermined state of pressure against the bead seating profile of the tire rim, the tire rim and the cleaning brush also being supported in such a manner that the cleaning brush can orbit relative to the outer peripheral surface of the tire rim while the cleaning brush is maintained in said predetermined orientation and in said predetermined state of pressure against the bead seating profile of the rim, to effect cleaning of the bead seating profile of the tire rim as the cleaning brush rotates about its axis and orbits relative to the outer peripheral surface of the tire rim, said means for supporting the cleaning brush comprising a guide roller coupled to said cleaning brush and disposed in spaced relation to said cleaning brush about the periphery of the tire rim, the spacing between said guide roller and said cleaning brush being adjustable to adjust the pressure of the cleaning brush against the bead seating profile of the tire rim, and means for selectively adjusting the spacing between the guide roller and the cleaning brush to adjust the pressure of the cleaning brush against the bead seating profile of the tire rim.

3. Apparatus for cleaning the annular bead seating profile of a tire rim, the bead seating profile being integral with the tire rim and circumscribing the central axis of the tire rim, said apparatus comprising means for supporting the tire rim with the central axis of the rim disposed in a predetermined orientation, a cleaning brush rotatable about an axis of rotation, means for rotating the cleaning brush about said axis of rotation, means for supporting the cleaning brush in an orientation in which it engages the bead seating profile at the outer peripheral surface of the tire rim as the cleaning brush rotates about its axis of rotation for maintaining the cleaning brush under a predetermined state of pressure against the bead seating profile of the tire rim, the tire rim and the cleaning brush also being supported in such a manner that the cleaning brush can orbit relative to the outer peripheral surface of the tire rim while the cleaning brush is maintained in said predetermined orientation and in said predetermined state of pressure against the bead seating profile of the rim, to effect cleaning of the bead seating profile of the tire rim as the cleaning brush rotates about its axis of rotation and orbits relative to the outer peripheral surface of the tire rim, said means for supporting said cleaning brush including pressure means coupled with said cleaning brush and engageable with the outer periphery of a tire rim at a location that is spaced from the cleaning brush about the periphery of the rim, the spacing between the pressure means and the cleaning brush being adjustable to adjust the pressure of the cleaning brush against the bead seating profile of the tire rim, and means for selectively adjusting the spacing between the pressure means and the cleaning brush to adjust the pressure of the cleaning brush against the bead seating profile of the tire rim.

4. Apparatus as set forth in claim 1 wherein said means for supporting a tire rim comprises means for supporting the tire rim so that it circumscribes a central shaft, and said means for supporting the cleaning brush further includes a cross tube extending at least partially across the tire rim, one end of the cross tube being connected with said cleaning brush and the other end of the cross tube being connected with said guide roller, said cross tube having a hub that surrounds said central shaft of the means for supporting the tire rim and being eccentrically mounted relative to said central shaft, and means for changing the eccentricity of the hub relative to said central shaft for adjusting the spacing between the cleaning brush and the guide roller.

5. Apparatus as set forth in claim 4 including a first support frame connected to one end of the cross tube and a motor supported on the first support frame, said cleaning brush being supported by said first support frame for rotation about its axis of rotation, and means for coupling the output shaft of the motor to the cleaning brush to rotate the cleaning brush about its axis of rotation.

6. Apparatus as set forth in claim 5 wherein said cleaning brush is supported from said cross tube in a manner that allows said cleaning brush to be selectively moved in a radial direction relative to a tire rim, thereby permitting the cleaning brush to be moved into and out of engagement with the bead seating profile at the outer periphery of a tire rim.

7. Apparatus as set forth in claim 6 wherein said cleaning brush support means includes means for selectively positioning the brush in an axial direction along the periphery of a tire rim.

8. Apparatus as set forth in claim 7 including a second support frame connected to the other end of the cross tube, a longitudinal support member having an end pivotally connected to the second support frame, said guide roller being supported for rotation at the other end of the longitudinal support member, a pivot rod pivotally connected to the longitudinal support member and the frame at an intermediate point on said longitudinal support member, said pivot rod being pivotal relative to said longitudinal support member and to said second support frame to allow said longitudinal member to pivot about said support frame, and means for locking the pivot rod with the longitudinal support member and the second support frame to lock the guide roller in a predetermined angular position relative to the support frame.

9. Apparatus as set forth in claim 2 wherein said means for supporting a tire rim comprises means for supporting the tire rim so that it circumscribes a central shaft, and said means for supporting the cleaning brush further includes a cross tube extending at least partially across the tire rim, one end of the cross tube being connected with said cleaning brush and the other end of the cross tube being connected with said guide roller, said cross tube having a hub that surrounds said central shaft of the means for supporting the tire rim and being eccentrically mounted relative to said central shaft, and means for changing the eccentricity of the hub relative to said central shaft for adjusting the spacing between the cleaning brush and the guide roller.

10. Apparatus as set forth in claim 9 including a first support frame connected to one end of the cross tube and a motor supported on the first support frame, said cleaning brush being supported by said first support frame for rotation about its axis of rotation, and means for coupling the output shaft of the motor to the cleaning brush to rotate the cleaning brush about its axis of rotation.

11. Apparatus as set forth in claim 10 wherein said cleaning brush is supported from said cross tube in a manner that allows said cleaning brush to be selectively moved in a radial direction relative to a tire rim, thereby permitting the cleaning brush to be moved into and out of engagement with the outer periphery of a tire rim.

12. Apparatus as set forth in claim 11 wherein said cleaning brush support means includes means for selectively positioning the brush in an axial direction along the periphery of a tire rim.

13. Apparatus as set forth in claim 12 including a second support frame connected to the other end of the cross tube, a longitudinal support member having an end pivotally connected to the second support frame, said guide roller being supported for rotation at the other end of the longitudinal support member, a pivot rod pivotally connected to the longitudinal support member and the frame at an intermediate point on said longitudinal support member, said pivot rod being pivotal relative to said longitudinal support member and to said second support frame to allow said longitudinal member to pivot about said support frame, and means for locking the pivot rod with the longitudinal support member and the second support frame to lock the guide roller in a predetermined angular position relative to the support frame.

14. Apparatus for cleaning the annular bead seating profile of a tire rim, the bead seating profile being integral with the tire rim and circumscribing the central axis of the tire rim, said apparatus comprising means for supporting the tire rim with the central axis of the rim disposed in a predetermined orientation, a cleaning brush rotatable about an axis of rotation, means for rotating the cleaning brush about said axis of rotation, means for supporting the cleaning brush in an orientation in which it engages the bead seating profile at the outer peripheral surface of the tire rim as the cleaning brush rotates about its axis of rotation for maintaining the cleaning brush under a predetermined state of pressure against the bead seating profile of the tire rim, the tire rim and the cleaning brush also being supported in such a manner that the cleaning brush can orbit relative to the outer peripheral surface of the tire rim while the cleaning brush is maintained in said predetermined orientation and in said predetermined state of pressure against the bead seating profile of the rim, to effect cleaning of the bead seating profile of the tire rim as the cleaning brush rotates about its axis of rotation and orbits relative to the outer peripheral surface of the tire rim, said means for supporting said cleaning brush including pressure means coupled with said cleaning brush and with the means for supporting the tire rim and applying pressure therebetween to support the cleaning brush in spaced relation to the means for supporting the tire rim and in said predetermined state of pressure against the bead seating profile of the tire rim, the spacing between the cleaning brush and the pressure means being adjustable to adjust the pressure of the cleaning brush against the bead seating profile of the tire rim, and means for selectively adjusting the spacing between the pressure means and the cleaning brush to adjust the pressure of the cleaning brush against the bead seating profile of the tire rim.

* * * * *